3,489,242
**ACOUSTICAL PANEL COMPRISING VISCO-
ELASTIC MATERIAL WITH HEAVY FILLER
PARTICLES**
Edward K. Gladding and Kenneth D. Ziegel, Wilmington,
Del., assignors to E. I. du Pont de Nemours and Company, Wilmington, Del., a corporation of Delaware
No Drawing. Filed Apr. 1, 1969, Ser. No. 812,442
Int. Cl. G10k 11/14; E04b 1/99; B32b 5/16
U.S. Cl. 181—33                                      10 Claims

ABSTRACT OF THE DISCLOSURE

An acoustic damping structure involving a substrate, subject to resonant vibration, adhered to an unconstrained layer of viscoelastic material containing at least 35% by volume irregularly shaped and non-uniformly sized filler particles having a specific gravity of at least 2.5, and a maximum dimension of 0.1 millimeter.

---

This invention concerns acoustic damping structures prepared from filled viscoelastic materials.

It is known that objectionable air-borne noise emanating from sources such as motors, industrial machines, ball-mills, grinders, etc., can be reduced by separating the noise source from its surroundings by means of an acoustical barrier capable of attenuating the air-borne noise. U.S. 3,424,270 discloses such a sound barrier structure in which an acoustical material is constrained in sandwich fashion between relatively rigid outer layers. It is also known that noise emanating from structures excited to resonant vibration can be reduced by applying a damping layer to the structure. The latter is known as "free-layer" damping when there is no outer constraining layer. Examples of structures that have been so treated are the various metal panels of automobiles, aircraft, home appliances, wall partitions, file cabinets, etc.

Viscoelastic polymers by themselves are not efficient free-layer vibration damping materials because their combination of modulus and loss tangent values does not permit efficient dissipation of vibrational energy from the high modulus structural materials, such as steel, aluminum, etc. It has been proposed that incorporation of fillers in platelet form into viscoelastic polymers can enhance their free-layer damping capabilities as disclosed, for example, in U.S. Patent 3,079,277. Compositions including various polymeric binders filled with grtphite, carbon black, sand, lead, etc., have been considered and used to a limited extent for damping metallic substrates, as in the cases of electronic equipment, in hulls of marine craft, and the like. There has been a need for a damping structure which is much more effective than these prior art structures afford.

In accordance with this invention there is provided an efficient acoustic unconstrained damping structure which consists essentially of a substrate, resonant vibrations of which are sought to be minimized, coated with a viscoelastic material containing at least 35% by volume of irregularly shaped and non-uniformly sized filler particles having a specific gravity of at least 2.5 and a maximum dimension of 0.1 millimeter (mm.). The average dimensional ratio of the largest to the smallest particle is at least 40:1, which means that the quotient obtained by dividing one-half the sum of the maximum and minimum dimensions of the largest particle by one-half the sum of the maximum and minimum dimensions of the smallest particle is at least 40. Preferably the glass transition temperature of the viscoelastic material will be within 15° C. of the ambient temperature of the structure's use.

The structures of this invention are free-layer damped and, for this reason, the normal resonant vibration amplitude of the substrate is reduced with concomitant reduction in its radiation of objectionable noise. Additionally, because the adhered coating of filled viscoelastic material is of high density and thus provides large weight (or mass) per unit area, the structure is also capable of functioning as a sound transmission barrier. The structure, simultaneously, is capable of reducing self-generated noise and reducing air-borne noise transmitted through it, from one side to the other, as for example, is desirable in a steel wall panel. A large number of viscoelastic materials and filler matetials are useful and provide a wide variety of physical characteristics as may be necessary for particular applications.

The filler materials can be any inert substance meeting the above stated requirements. As will be illustrated by the examples, a substantial gain in acoustical damping effectiveness is achieved if the specific gravity of the solid is at least 2.5. Solids of lower specific gravity, such as ground anthracite, diatomaceous silica and carbon black, are much less effective.

The filler material is solid and finely divided, with a maximum particle dimension of 0.1 mm. and preferably in the particle size range $10^{-5}$ mm. to $10^{-1}$ mm. The ratio of the average dimension of the largest to that of the smallest particles must be at least 40:1 and is preferably at least 200:1. Thus, it has been found that the particles, in addition to being small, must have a wide range of sizes. While it is not necessary that the particle sizes be uniformly distributed throughout the range, such a distribution is preferable. In any event a size distribution is preferred which makes possible the closest possible packing of solid particles in the matrix, thus contributing to a composite of the highest possible density that can be blended and shaped by practical techniques. It is believed that the improved packing allows a uniform strain magnification throughout the mass, and a maximum achievable energy loss, i.e., vibration damping capacity. The particles are irregular in three dimensions; plate-like particles are not useful herein.

Especially economical and effective representative particulate solids for use in this invention include iron powder, iron pyrites, ilmenite ore and finely ground silica sand, but other solid particles, inert to the viscoelastic material and meeting the above requirements can be used. These include powdered metals, naturally occurring minerals such as powdered iron and the like. Preferred fillers are the hard, dense, brittle, inexpensive minerals which can be converted readily to fine, irregularly shaped particles having a wide distribution of particle sizes by grinding, ball-milling, hammer-milling, etc. To this end, in general, the mineral should have a mohr hardness of four or greater. Soft, ductile materials are not desirable. They are difficult to grind or mill to the desired particles and furthermore tend to distort and coalesce in the process for making the acoustical damping composition as described below.

The vibration damping capacity of the structures of this invention is achieved if the particulate filler is present in at least a 0.35 volume fraction of the whole. A volume fraction of 0.6–0.65 is preferred as providing most effective damping.

The matrix elastomeric material can be any viscoelastic polymer capable of being compounded with the particulate solid as defined. Typical polymers that can be used include ethylene-vinyl acetate copolymers, ethylene acrylic acid copolymers, chlorinated or sulfochlorinated polyolefins, natural or synthetic rubbers such as poly (isobutylene), poly(butadiene/styrene) or nitrile rubbers, chloroprene homopolymers and copolymers, vinyl or vinylidene chloride copolymers, and polyurethane elastomers. EPDM polymers such as the elastomeric dipolymers of ethylene/propylene and particularly terpolymers of ethylene/propylene/non-conjugated diene in which the diene is 1,4-headiene, dicyclopentadiene, 5-methylene-2-norbornene or 5-ethylidene-2-norbornene can also be used. A particularly preferred polyurethane is made from 1 mole of polypropylene ether glycol, M.W. 1000, 2.5 moles of 1,3-butanediol and 3.4 to 3.6 moles of 80:20 2,4:2,6-toluene diisocyanate. This polyurethane has the advantage of being readily millable because of its substantially linear chain structure. It readily accepts solid fillers at the required concentrations and gives a highly effective damping composition when compounded according to the principles outlined.

Any suitable adhesive can be utilized to adhere the filled viscoelastomeric material to the metal or other substrate to be damped. Such adhesives are well known, as for example, epoxy, neoprene, and "Eastman 910" adhesives. Desirably the filled material will cover all of the substrate or at least as much as possible without interfering with its operative function. The layers of filled viscoelastic material should be sufficiently thick to achieve the desired result within practical limits of expense and use of the substrate.

The damping obtained will depend on the thickness ratio of the viscoelastic damping material relative to the material or other substrate. Damping increases approximately in proportion to the square of the thickness ratio, up to a maximum value which depends on the frequencies and temperatures employed. The maximum damping value is of the order of 15% to 18% of critical damping.

The temperature range of maximum energy dissipation for polyurethanes depends on the composition of the polymer. The compositions can, therefore, be "tailored" for each individual use, depending on the ambient temperature expected in service. Thus toluene diisocyanate:polypropylene ether glycol molar ratios of 2.5, 3.5, and 4.5 in polyurethanes similar to the above-described preferred composition give damping maxima at 0° C., 25° C. and 45° C., respectively.

Acoustical damping compositions according to the present invention are readily made by milling the components together in conventional rubber or plastic processing equipment, such as roll mills or internal mixers. Alternately, filler is added to liquid prepolymer which is cured to solid matrix. Sheets of the milled composition can be calendered in the usual way and applied to metallic or other rigid substrates by press or roll lamination, using any conventional adhesive if required.

Compositions of the invention are particularly effective in damping vibrations in situations where metallic sheet structures are employed, as in household appliances, automobiles, marine craft, interior and exterior metal wall panels and the like. Non-metallic sheet structures such as plywood and hardboard building panels, gypsum wall board, reinforced plastic sheets and the like can be given valuable sound barrier properties by lamination with the compositions of the invention.

In the following examples, test compositions are prepared as follows:

*Polymer A* is made by mixing in a glass vessel 3.5 moles of an 80/20 mixture of 2,4/2,6-tolylene diisocyanate, 1 mole of polypropyleneether glycol (mol. wt. 960–1040) and 2.5 moles of 1,3-butanediol. The vessel is evacuated to degas the mixture, which is then poured in a mold lined with polytetrafluoroethylene resin and heated for at least 16 hours at 80°–115° C. to convert it into a solid elastomer. The specific gravity is 1.17.

*Polymer B* is similarly made, using a mole ratio of tolylene diisocyante to polypropyleneether glycol of 2.5. The total NCO/OH ratio is adjusted to 1:1 by addition of 1,3-butanediol. The specific gravity is 1.17.

*Polymer C* is similarly made, using a mole ratio of tolylene diisocyanate to polypropyleneether glycol of 4.5. The total NCO:OH ratio is adjusted to 1:1 by addition of 1,3-butanediol. Specific gravity is 1.17.

The vibration damping composition is made by mixing filler with polymer on a 2-roll rubber mill at about 50° C. Sheets of this compound 0.25–6.25 mm. thick are formed by pressing in a mold for 3 minutes at 150° C. or by calendering on a 3-roll calender. Test specimens are then made by press laminating a sheet of the test composition with neoprene cement to a 1.3 mm. inch thick steel beam to give a 1.3 mm. layer of damping composition.

A preferred method for testing vibrational damping efficiency consists of adhering a damping composition to a strip of metal, usually cold rolled steel (250 mm.×9.1 mm.)

and of convenient thickness (e.g., 1.5 mm.). The adherent can be an epoxy cement thinly spread between the metal and the damping material. The composite beam thus constructed is then clamped at one end and set into vibration at the other. This is typically accomplished by placing a magnetic transducer in close proximity to the free end of the beam; application of a variable frequency sinusoidal electrical input to the transducer causes the beam to vibrate. At certain frequencies the beam will be in a state of resonance. A second magnetic transducer, located betwen the damped and free end measures the velocity response as a function of frequency, hence a visual or graphical display of this output response establishes the resonance conditions. The effective damping of the metal beam caused by the presence of the adhered material can be expressed as the percent of critical damping (percent $C/C_o$), and is a measure of the extent to which critical damping is achieved. At critical damping the damped structure does not vibrate, that is, the classical damping curves does not cross the $x$-axis. The percent $C/C_o$ is defined as one-half the ratio of the half power bandwidth ($\Delta f$) (the frequency width of resonance at −3 db) to the resonant frequency, ($f_o$), or $$\text{Percent } C/C_o = \frac{\Delta f}{2 f_o} \times 100$$

Results of such tests at 23° C. using Polymer A as the matrix material are shown in Examples 1–6 in Table I. An improvement over the control (Improvement Factor) of 6 or more represents very good damping.

TABLE I

| | Filler | Filler,[2] sp. gr. | Dimensions[4] of Particles | | Particle[3] size, ratio | Vol.[1], percent | Percent critical damping | Improvement factor |
|---|---|---|---|---|---|---|---|---|
| | | | Largest | Smallest | | | | |
| Example: | | | | | | | | |
| 1 | Iron | 7.83 | 8.5 | 0.13 | 65.4 | 35.0 | 2.8 | 7.2 |
| 2 | do | 7.83 | 8.5 | 0.13 | 65.4 | 60.0 | 6.7 | 17.2 |
| 3 | Iron pyrites | 4.89 | 5.0 | 0.02 | 250.0 | 61.0 | 6.90 | 17.7 |
| 4 | do | 4.89 | 5.0 | 0.02 | 250.0 | 64.6 | 7.45 | 19.1 |
| 5 | Ilmenite ore | 4.5 | 11.0 | 0.04 | 275.0 | 61.0 | 4.18 | 10.7 |
| 6 | Sand | 2.75 | 4.167 | 0.102 | 40.9 | 59.3 | 3.79 | 9.5 |
| Control A | No filler | | | | | 0 | 0.39 | |
| Control B | Anthracite coal | 1.53 | 5.33 | 0.24 | 22.2 | 58.7 | 1.52 | 3.9 |
| Control C | Diatomaceous silica | 2.14 | 5.66 | 0.12 | 47.2 | 53.4 | 1.53 | 3.9 |

[1] Volume in percent of filler to filled viscoelastic material (Polymer A).
[2] Specific gravity of viscoelastic material alone is 1.17.
[3] Average dimensional ratio of largest to smallest particle.
[4] Microns (1 micron=10⁻³ mm.).

To determine the effect of varying the composition of polyurethane used, three test compositions were prepared from Polymers A, B and C, containing 64 volume percent of iron pyrites. Maximum damping occurs at temperatures shown in Table II.

TABLE II

| Example: | Polymer | Temperature range of maximum damping, °C. | Percent critical at maximum |
|---|---|---|---|
| 7 | B | 0–6 | 7.6 |
| 8 | A | 20–28 | 7.45 |
| 9 | C | 34–38 | 5.9 |

For morst effective vibration damping in any particular application of this invention it is important that the viscoelastic material be selected on the basis of its glass transition temperature. Vibration damping by structures of this invention is most effective if the glass transition temperature of the viscoelastic material is within about 15° C., preferably within 10° C., of the ambient temperature at which the structure is subjected to vibrational forces. Thus at −40° C. an ethylene/propylene/1, 4-hexadiene terpolymer is very effective whereas at +80° C. a chlorosulfonated ethylene polymer would be a good choice and at +20° C. one might well choose a neoprene. The art is well aware of the glass transition temperatures of the various viscoelastic polymers useful in this invention and on this basis can readily select specific polymers for best results in particular applications. In cases where commercially available polymers do not exactly suit a particular need with respect to the esthetic and/or physical properties wanted, polymers can be made to suit the objective. For example, there can be prepared by known procedures polyurethanes with a variety of glass transition temperatures to suit various operation temperatures and physical property requirements.

In addition to the viscoelastic materials mentioned above acrylic polymers are useful and one such polymer in particular is the 49.5/47.5/3 methylmethacrylate/2-ethylhexyl acrylate/methacrylic acid terpolymer iminated substantially completely by reaction with propylene imine. This material filled with iron pyrites is particularly effective for free-layer damping of metal substrates such as automobile components.

We claim:
1. An acoustic damping structure consisting essentially of a substrate adhered to an unconstrained layer of viscoelastic material containing at least 35% by volume irregularly shaped non-uniformly sized filler particles having a specific gravity of at least 2.5 and a maximum dimension of 0.1 millimeter, the average dimensional ratio of the largest to the smallest particle being at least 40:1.

2. The structure of claim 1 in which the substrate is metal and the viscoelastic material is an elastomeric polymer.

3. The structure of claim 2 in which the polymer is a polyurethane.

4. The structure of claim 3 in which the polyurethane is the reaction product of one mole of polypropylene ether glycol having a molecular weight of about at least 1000, about 2.5 moles of 1,3-butanediol and about 3.4–3.6 moles of an 80:20 mixture by weight of 2,4:2,6-toluene diisocyanate and containing as filler about 5–8 parts by weight of iron pyrites for each part by weight of polyurethane.

5. The structure of claim 2 in which the specific gravity is at least 3 and the particles have dimensions ranging from about 0.1 to $10^{-5}$ millimeters and the viscoelastic material contains at least 50% by volume of filler particles.

6. The structure of claim 5 in which the polymer is a polyurethane.

7. The structure of claim 6 in which the polyurethane is the reaction product of one mole of polypropylene ether glycol having a molecular weight of about at least 1000, about 2.5 moles of 1,3-butanediol and aboout 3.4–3.6 moles of an 80:20 mixture by weight of 2,4:2,6-toluene diisocyanate and containing as filler about 5–8 parts by weight of iron pyrites for each part by weight of polyurethane.

8. The structure of claim 2 in which the elastomeric polymer has a glass transition temperature within about 15° C. of the average temperature at which the substrate is subjected to vibration.

9. The structure of claim 1 in which the viscoelastic material is an ethylene/vinyl acetate copolymer.

10. The structure of claim 1 in which the viscoelastic material is a 49.5/47.5/3 methylmethacrylate/2-ethylhexyl acrylate/methacrylic acid terpolymer iminated by reaction with propylene imine.

References Cited
UNITED STATES PATENTS 2,999,041  9/1961  Lappala.
3,056,707  10/1962  Helbing et al.

ROBERT S. WARD, JR., Primary Examiner

U.S. Cl. X.R.

161—162